S. E. CREASEY.
SQUEEZER.
APPLICATION FILED DEC. 18, 1919.
1,341,496. Patented May 25, 1920.
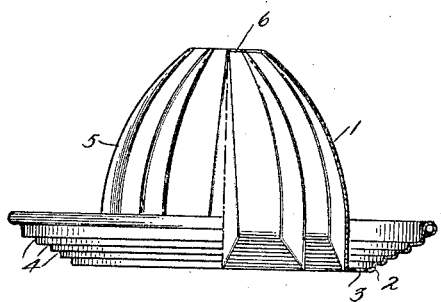
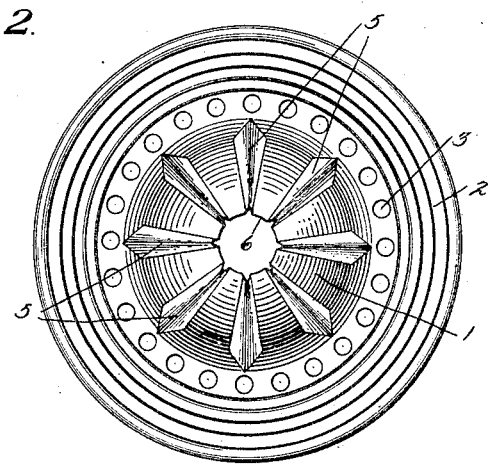
WITNESSES
Bernard Aebly
S. W. Foster
INVENTOR
SAMUEL E. CREASEY
BY Munn & Co.
ATTORNEYS

UNITED STATES PATENT OFFICE.

SAMUEL E. CREASEY, OF SANFORD, MAINE.

SQUEEZER.

1,341,496.　　　　　Specification of Letters Patent.　　Patented May 25, 1920.

Application filed December 18, 1919. Serial No. 345,826.

*To all whom it may concern:*

Be it known that I, SAMUEL E. CREASEY, a citizen of the United States, and a resident of Sanford, in the county of York and State of Maine, have invented a new and Improved Squeezer, of which the following is a full, clear, and exact description.

This invention relates to improvements in squeezers, and more particularly to juice extractors which are commonly known as "lemon squeezers," although, of course, the device may be used for oranges or other fruit, an object of the invention being to provide a device of the character stated which is provided with an opening in the upper end of its ribbed or corrugated conical body portion to accommodate the core of the fruit.

A further object is to provide a device of the character stated which will not only accommodate the core, but which will also operate to cut the fibers connected to the core and thus expose the meat of the fruit to the squeezing action against the surface of the cone to easily and thoroughly extract the juice.

With these and other objects in view the invention consists in certain novel features of construction, and combinations and arrangements of parts, as will be more fully hereinafter described and pointed out in the claims.

In the accompanying drawings—

Figure 1 is a view half in elevation and half in longitudinal section illustrating my improved device;

Fig. 2 is a top plan view; and

Fig. 3 is an enlarged fragmentary view in longitudinal section illustrating the upper end of the conical body.

My improved squeezer is preferably of aluminium, although it may, of course, be of other metal or of any other suitable material. The device has a conical body 1 which at its lower end connects with an integral annular trough 2, the latter having a perforated bottom 3 for the escape of the juice. The trough 2 is preferably of stepped formation, as shown at 4, so that it can readily fit the upper end of a glass or other receptacle to catch the juice which falls through the perforated bottom 3.

The body 1 is provided with longitudinal ribs 5 which are preferably formed by relatively sharp or angular corrugations in the metal of the body 1. An opening 6 is provided at the upper end of the body 1 and this opening 6 is sufficiently large in diameter to accommodate the core of the fruit, and by reason of the corrugations of the body, the wall of this opening is notched or irregular, as shown clearly in Fig. 2, so that a sharp cutting edge is provided which serves to sever the fibers of the fruit as the latter is pressed downwardly or turned on the conical body.

In operation, the fruit is cut in half, as is customary, and is then placed on the upper end of the body 1 and forced downwardly and turned. This downward and rotary movement of the fruit causes the sharp cutting edge at the wall of the opening 6 to sever the fibers of the fruit around the core and the core passes through the opening while the juice of the fruit flows down the outside of the body into the trough 2. It is, of course, to be understood that the core is not entirely severed from the skin of the fruit so that when the juice is fully extracted, the skin is removed and will carry with it the core.

Various slight changes may be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A squeezer of the character stated, comprising a cone-shaped hollow body portion having an open upper end, and a relatively sharp notched cutting edge around the open end.

2. A squeezer of the character stated, comprising a cone-shaped longitudinally corrugated metal body portion having an open upper end with the corrugations extending to the opening and forming a relatively sharp notched cutting edge around the opening, and an annular trough at the lower end of the body.

SAMUEL E. CREASEY.